Nov. 18, 1952     C. L. WAGNER     2,618,096
FISH LURE
Filed May 20, 1947
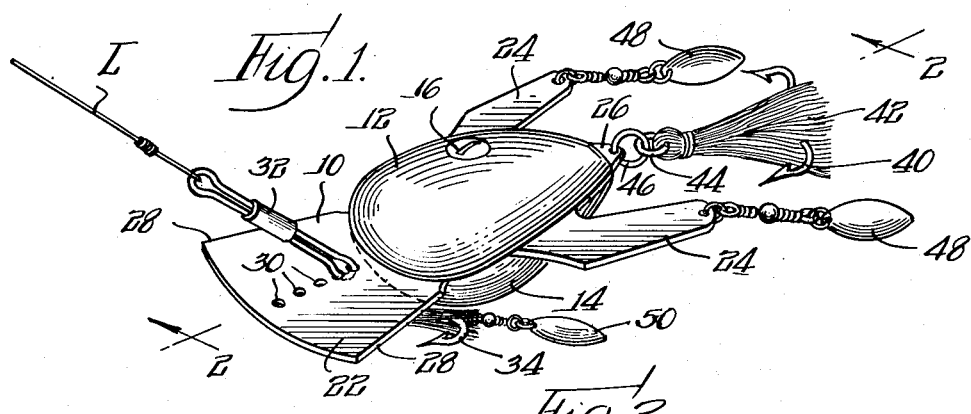
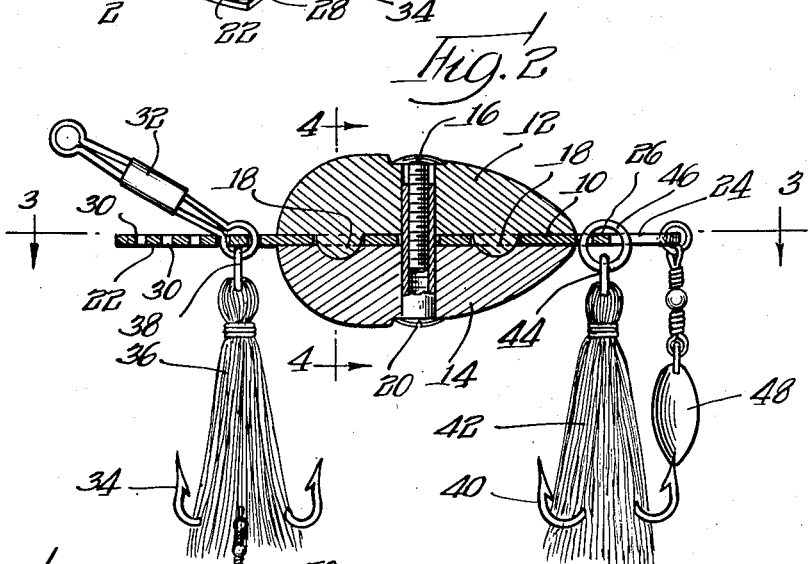
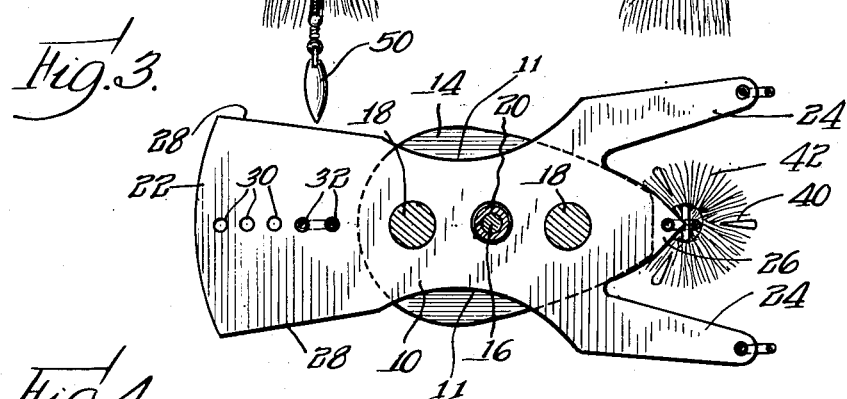
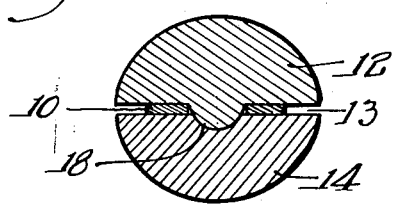
INVENTOR.
Clyde L. Wagner
BY
Moore, Olson & Trexler
Attys.

Patented Nov. 18, 1952

2,618,096

UNITED STATES PATENT OFFICE 2,618,096

FISH LURE

Clyde L. Wagner, Tulsa, Okla.

Application May 20, 1947, Serial No. 749,164

5 Claims. (Cl. 43—42.47)

1

This invention relates to fish lures, particularly of the type having detachable body portions to enable bodies of various colors and shapes to be employed.

An object of this invention is to provide a novel lure of the aforesaid character having a substantially flat, horizontal center plate with a flared, forwardly extending nose portion to which a connecting link may be attached at any of a number of points on the nose depending upon how deeply the lure is desired to run in the water.

A further object is to provide a lure having a broad, flat nose member and a detachable, rounded body portion, the nose member being substantially horizontal and of such configuration that the lure is caused to dart about in natural fashion as it is drawn through the water.

A still further object is to provide an improved fish lure having the foregoing features and including spinners attached to the lure at various points, these spinners being disposed in such manner as to enhance the life-like appearance of the lure.

The above and various other objects, advantages and features of the invention will be apparent from the following specification when taken in connection with the accompanying drawing wherein a certain preferred embodiment is set forth for purposes of illustration.

In the drawing, wherein like reference numerals refer to like parts throughout:

Fig. 1 is a perspective view of a fish lure constructed in accordance with and embodying the principles of the invention;

Fig. 2 is a longitudinal section taken on the line 2—2 in Fig. 1;

Fig. 3 is a horizontal section on the line 3—3 in Fig. 2; and

Fig. 4 is a transverse section on the line 4—4 in Fig. 2.

My improved fish lure may be constructed in such manner as to simulate a desired form of live bait, such as a frog, crawfish or the like. In general, referring to the drawing, the lure comprises a substantially flat, horizontal center plate 10 and a rounded, detachable body formed in two halves 12 and 14 that are attached by a suitable bolt 16 to the plate 10 on opposite sides thereof. The body parts 12 and 14 are made of suitable material such as wood, plastic or cork and are painted or otherwise colored in any desired manner. As shown, the part 12 is provided with dowel pins 18 that extend through holes in the plate 10 and are received in complementary recesses in the part 14. If desired, however, dowel pins may be formed on the plate 10 to be received in recesses in both of the body sections 12 and 14. The bolt 16 passes through openings in the two body parts 12 and 14 and the plate 10 and is threaded into a nut 20. The bolt 16 and the dowel pins 18 are longitudinally spaced in the lure body and serve to maintain this body secured in fixed position on the plate 10.

The plate 10 is made of metal such as aluminum and is formed with a forwardly extending nose portion 22, rearwardly extending leg portions 24 and the tail portion 26. In accordance with my invention the nose 22 is broad and flat and has forwardly diverging side edges 28. The maximum width of the nose 22 preferably is equal to or greater than the maximum width of the body. A series of longitudinally spaced holes 30 is formed in the nose 22 centrally thereof. A connecting link 32 adapted to be attached to a fishing line L has a part which is looped through a pair of the holes 30 in the nose 22. Depending upon how deeply the lure is desired to run in the water, the connecting link may be positioned in any selected pair of holes 30.

The edges of plate 10 intermediate the nose portion 22 and the leg portions 24 are curved inwardly as at 11 so that the edges of the body halves 12 and 14 extend outwardly beyond the edges 11 in the assembled condition. This provides a pair of channel portions indicated between numeral 13 and best shown in Figure 4. The tail portion 26 is shaped generally to correspond to the shape of the body halves 12 and 14. The leg portions 24 are formed on plate 10 and are disposed to the rear and outwardly of the channel portions 13. It will be noted that the leg portions 24 diverge outwardly and rearwardly away from the plate 10.

A fish hook 34 having a skirt 36 is connected by an eye 38 to the looped portion of the link 32 below the nose 22. Another fish hook 40 having a skirt 42 is connected by eyes 44 and 46 to the tail 26 of the plate 10. Spinners 48 are connected to the rear ends of the legs 24 to trail behind these legs as the lure travels through the water. If desired, a spinner 50 may be attached to the hook structure 34 to depend therefrom as shown in Fig. 2.

The body parts 12 and 14 are replaceable to adapt the lure for different uses. The illustrated form of the nose portion 22 has been found to be very effective in causing the lure to simulate the movement of live bait for attracting the fish. The spinners as 48 and 50 may be attached to the lure wherever they are found to be the most effective. Any type of fish hooks may be employed and located on the lure as desired.

It is obvious that various changes may be made in the specific embodiment set forth for purposes of illustration without departing from the principles of the invention. The invention is accordingly not to be limited to the precise details disclosed herein but includes all modifications thereof within the spirit and scope of the appended claims.

The invention is hereby claimed as follows:

1. A fish lure comprising a substantially flat plate including a central body portion, a nose portion extending forwardly from the body portion and a tail portion extending rearwardly from the body portion, a pair of body sections one mounted above and the other below said plate, the intermediate edges of the body portion of the plate being directed inwardly to a width less than the corresponding width of said body sections for providing with adjacent portions of the body sections a channel along each side of the body portion and between the overlying body sections, and fastening means to connect said body sections to said plate.

2. A fish lure as claimed in claim 1, wherein the plate includes leg portions in rear of said channel portions and disposed outwardly with respect thereto.

3. A fish lure as claimed in claim 1, wherein spaced projections on one body section extend through openings in said plate and are received in aligned apertures in the other body section.

4. A fish lure comprising a substantially flat plate including a forwardly extending nose portion and rearwardly extending leg portions, body sections disposed above and below said plate and mounted thereon intermediate said nose portion and said leg portions, the edges of said plate disposed between said nose portion and said leg portions being curved inwardly, the width of said plate at the point of said inwardly curved sides being less than the width of said body sections to form channel portions therebetween, said body sections being teardrop shaped with the tail of the body sections being disposed toward said leg portions, projections formed on one of said body sections and extending through apertures formed in said plate, the other of said body sections having apertures formed therein to receive said projections, and fastening means to connect said body sections to said plate.

5. A fish lure comprising a substantially flat plate including a forwardly extending nose portion and a rearwardly extending tail portion, said nose portion having forwardly diverging side edges extending to and diverging to the forward edge of the nose portion, leg portions formed on said plate intermediate said nose portion and said tail portion, said leg portions diverging outwardly and rearwardly, body sections disposed above and below said plate and mounted thereon intermediate said nose portion and said tail portion, said body sections being teardrop shaped with the tail of the body sections disposed toward said tail portion, the edges of the plate intermediate the nose portion and leg portions being curved inwardly to a width less than the width of the body sections to form with the body sections a channel on each side of the fish lure, and fastening means to connect said body sections to said plate.

CLYDE L. WAGNER.

REFERENCES CITED

The following references are of record in the file of this patent:

UNITED STATES PATENTS

| Number | Name | Date |
|---|---|---|
| D. 87,050 | Dunkelberger | May 31, 1932 |
| D. 118,064 | Wright | Dec. 12, 1939 |
| 903,333 | Slocum | Nov. 10, 1908 |
| 1,233,507 | Reynolds | July 17, 1917 |
| 1,297,617 | Welles | Mar. 18, 1919 |
| 1,568,325 | Dewey | Jan. 5, 1926 |
| 1,602,329 | Bonnett | Oct. 5, 1926 |
| 1,709,010 | Foss | Apr. 16, 1929 |
| 1,923,840 | Ozburn | Aug. 22, 1933 |
| 1,997,802 | Meyer | Apr. 16, 1935 |
| 2,006,604 | Post | July 2, 1935 |
| 2,119,045 | Dietrich | May 31, 1938 |
| 2,201,267 | Jacobson | May 21, 1940 |
| 2,283,960 | Wade | May 26, 1942 |
| 2,425,272 | Walker | Aug. 5, 1947 |